(12) United States Patent
Korzin

(10) Patent No.: US 7,908,054 B2
(45) Date of Patent: Mar. 15, 2011

(54) DEVICE FOR MANAGING POWER SUPPLY OF A MOTOR VEHICLE MULTIMEDIA SYSTEM

(75) Inventor: Stephane Korzin, Magny les Hameaux (FR)

(73) Assignee: RENAULT s.a.s., Boulogne Billancourt (FR)

( * ) Notice: Subject to any disclaimer, the term of this patent is extended or adjusted under 35 U.S.C. 154(b) by 889 days.

(21) Appl. No.: 11/576,842

(22) PCT Filed: Oct. 5, 2005

(86) PCT No.: PCT/FR2005/050810
§ 371 (c)(1),
(2), (4) Date: Aug. 7, 2007

(87) PCT Pub. No.: WO2006/037925
PCT Pub. Date: Apr. 13, 2006

(65) Prior Publication Data
US 2007/0288102 A1    Dec. 13, 2007

(30) Foreign Application Priority Data

Oct. 6, 2004 (FR) .................................. 04 10528

(51) Int. Cl.
*G06F 7/00* (2006.01)
(52) U.S. Cl. ................................................... 701/36
(58) Field of Classification Search .................. 701/24, 701/32–33, 35–36, 99, 115; 713/300, 320, 713/324
See application file for complete search history.

(56) References Cited

U.S. PATENT DOCUMENTS

| | | | |
|---|---|---|---|
| 6,195,597 B1 | 2/2001 | Yamada | |
| 6,208,931 B1 * | 3/2001 | Schoettle et al. | 701/115 |
| 6,393,573 B1 | 5/2002 | Gillespie et al. | |
| 7,276,815 B2 * | 10/2007 | Algrain et al. | 307/80 |

FOREIGN PATENT DOCUMENTS

EP    0 515 042    11/1992

* cited by examiner

*Primary Examiner* — Kim T Nguyen
(74) *Attorney, Agent, or Firm* — Oblon, Spivak McClelland, Maier & Neustadt, L.L.P.

(57) ABSTRACT

The invention concerns a device for managing power supply of a motor vehicle multimedia system, comprising a number of modules each having at least one function requiring electrical power supply, in particular in standby mode, such that it consists of a module receiving in input: a permanent electrical power supply from the vehicle battery; wake-up/sleep data from the vehicle control computer, based on the contact key in particular and from control means particular to the multimedia system; optionally wake-up and/or sleep control signals from certain modules belonging to the multimedia system itself, for: delivering to said multimedia system modules wake-up/sleep and/or switched power supply signals; saving data in the volatile storage means; keeping time through the metering means.

11 Claims, 8 Drawing Sheets

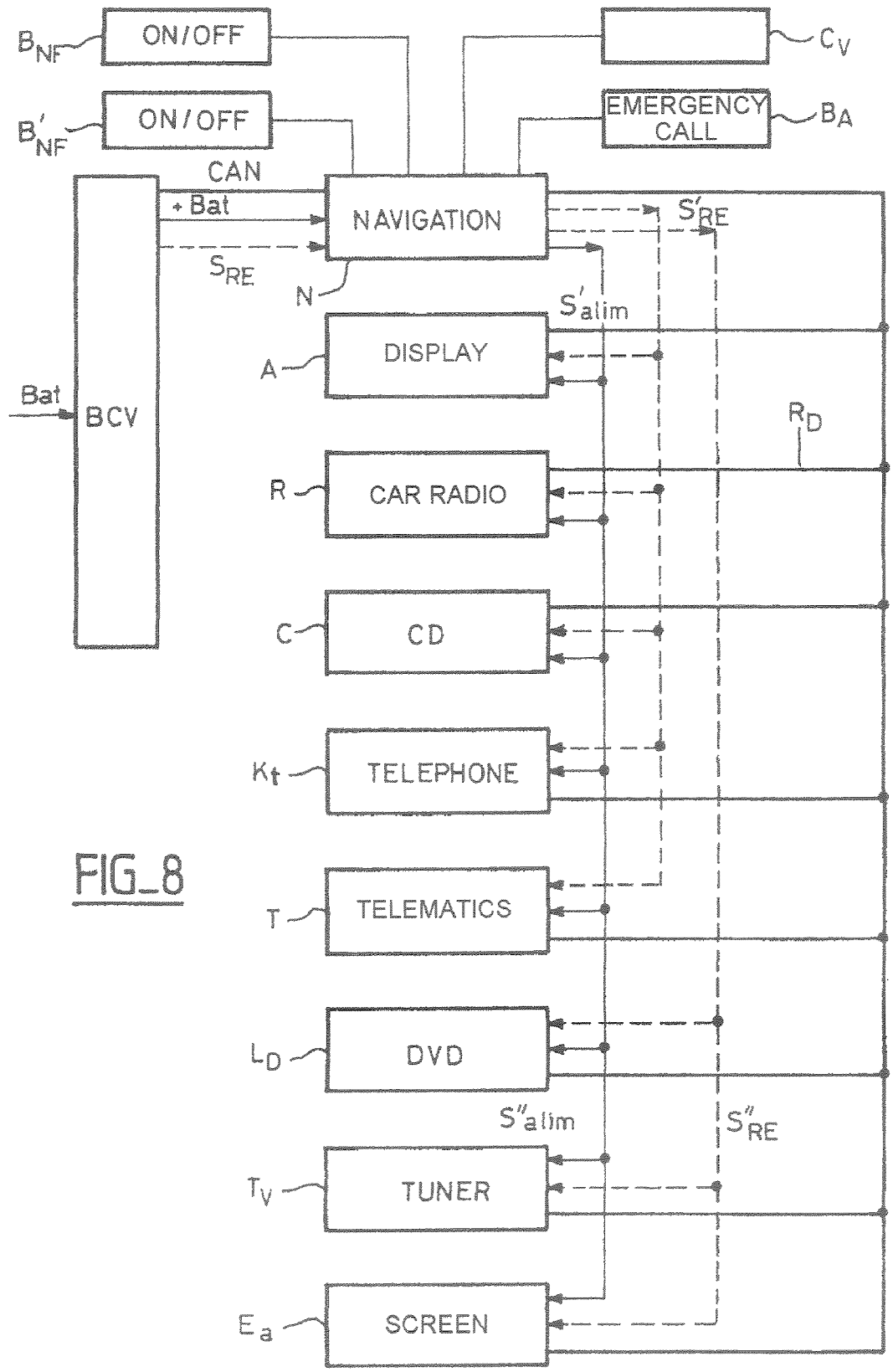
FIG_8

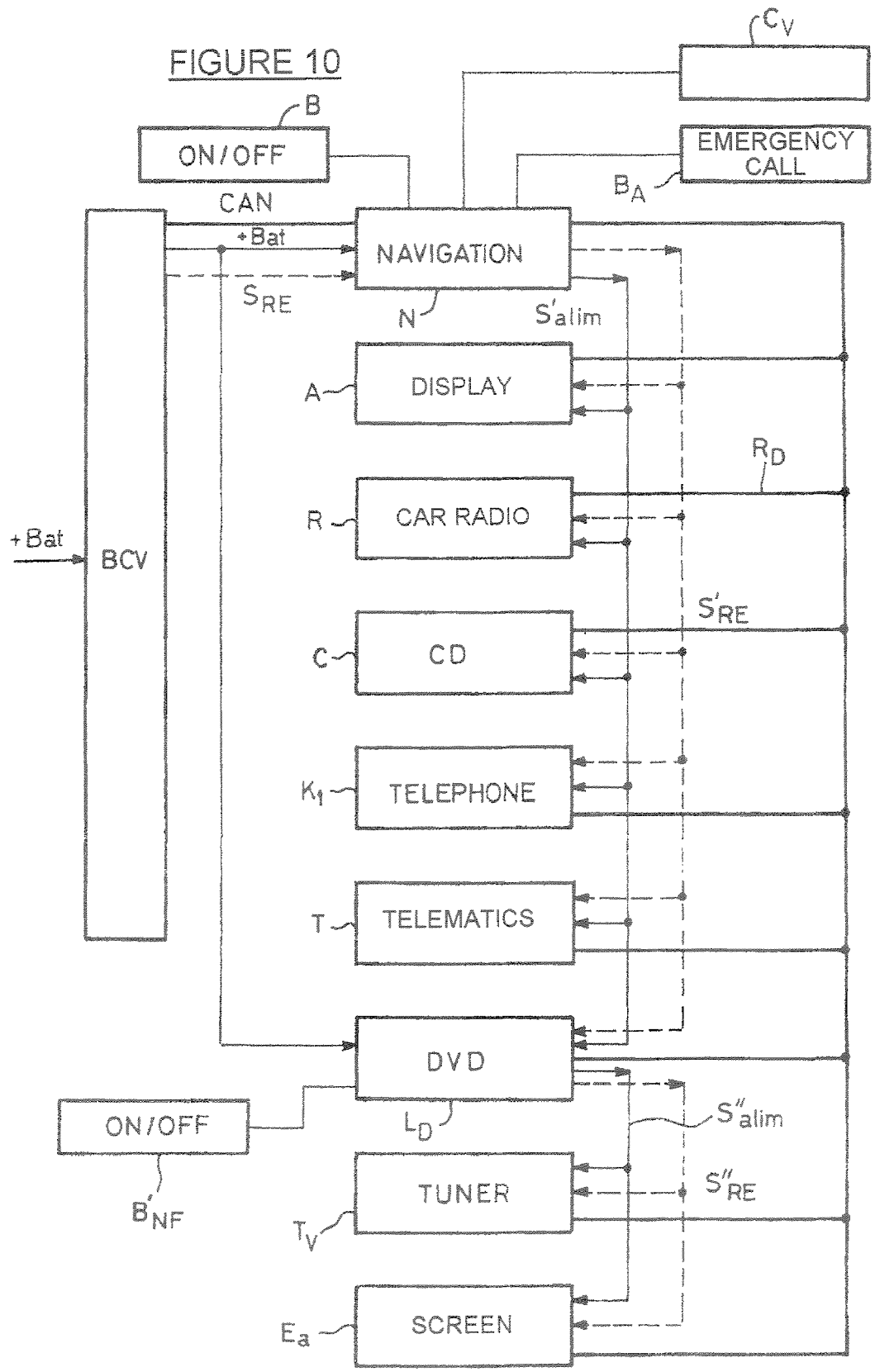

DEVICE FOR MANAGING POWER SUPPLY OF A MOTOR VEHICLE MULTIMEDIA SYSTEM

BACKGROUND

The invention relates to a device for managing the electrical power supply of the multimedia system installed in a motor vehicle, this system being one of the biggest consumers of electricity, particularly on standby when the vehicle is asleep. It therefore contributes strongly to the discharging of the vehicle battery particularly in long-stay parking phases.

A current multimedia system consists either of a single element, a radio set with integrated front panel and display or even a time and outside temperature display device for example, or several optional elements such as the two elements cited previously or a hands-free telephone kit or a navigation aid system or a telematics unit or a DVD player or even a television tuner for example. Each of these elements is linked by a cable to the vehicle's electrical power supply battery and draws a leak current when the vehicle is asleep, a holding current if it keeps certain information like the time or example, and a standby current awaiting wake-up information, by monitoring an ON/OFF button for example.

In practice, each element placed in a unit must remain powered when the vehicle is asleep that is when it is stopped the engine is switched off and the passenger compartment unoccupied, for example to maintain certain functions like time management, saving of certain information in random access memory RAM without backup, monitoring for a wake-up input or an action from the user by pressing a key for example. Obviously the more such reasons there are to maintain the electrical power supply the more the consumption increases.

Similarly, when the vehicle is woken up, only a part of the multimedia system may be invoked, the time and outside temperature display for example, so that the power supply for the other elements is not necessary.

BRIEF SUMMARY

The aim of the invention is to reduce the electrical energy consumption on standby or in operation by reducing the number of units powered with electricity, by combining several functions in one and the same unit.

As shown in FIG. 1, which is a diagram representing one exemplary current multimedia system for a motor vehicle, such a system is, for example, made up of a car radio R, a display A separately sited from the car radio unit and a compact disk changer C. These three elements are permanently electrically powered by the battery (+Bat) from the vehicle control computer BCV. The car radio R and the display A are furthermore connected by a wire to said computer which sends them a wake-up or sleep signal $S_{RE}$ for example when the driver turns the ignition key to the "accessory" position (+ACC) or "after contact" position (+APC). The car radio R can also be switched on or off, at any time, by an action on the part of the driver on an ON/OFF button (ON/OFF) of the multimedia system, mounted on the front panel and referenced $B_{NF}$.

When it is off, the car radio maintains its last known state, or the tuned frequency, the name of the station being listened to, the track number of the last compact disk listened to because the CD changer is connected to it, the position of the read head, etc., in order to start again from this state when next woken up.

The display A, separate from the car radio, displays not only the state of the radio which has just been described, but also the time and outside temperature, which appear even when the car radio R is off. This display keeps the time and also monitors the use by the driver of steering column controls $C_V$ to retransmit his will to the car radio by sending a frame over the CAN network for example, particularly concerning the sound volume or the choice of another station using a remote unit placed under the steering wheel.

When the car radio is woken up or put to sleep by the user pressing the ON/OFF button ($B_{NF}$), it simultaneously sends a wake-up or sleep signal $S'_{RE}$ to the display and to the CD changer. The latter, when asleep, maintains the state of its loader, that is, the empty or occupied state of each deck, the position of the read head, the number of the deck engaged, and so on. Thus, in a similar example of current multimedia system, the three elements remain permanently powered, even when the vehicle is asleep, and therefore discharge the battery, because the display consumes approximately 1 mA, the car radio 1 mA and the CD changer 0.5 mA, or a total of 2.5 mA.

The diagram of FIG. 2 represents another exemplary current multimedia system installed in a motor vehicle comprising a navigation aid system N, associated with a car radio R with compact disk changer C, with a video screen or separate display A in the front of the vehicle, a hands-free telephone kit $K_T$, a module T for telematics and a separate video system in the rear of the vehicle for the rear passengers, comprising in particular a DVD player $L_D$, a tuner $T_V$ and a screen $E_a$. All these modules that constitute the multimedia system are permanently powered by a signal $S_{bat}$ from the battery via the vehicle computer BCV.

The separate screen A in the front displays the time and outside temperature, navigation aid information, the state of the car radio R, telematics and telephone information, and the television or DVD film transmission being displayed in the rear.

The navigation aid system N keeps the time, monitors the use of the steering column controls $C_V$ by the driver, manages the display priorities between the information from the various elements of the system and offers menus for controlling the latter.

The driver can at any time switch on the multimedia system by pressing the ON/OFF button $B_{NF}$ located on the car radio R. Similarly, the vehicle can also send wake-up information $S_{RE}$ from the system to the navigation function, for example when the driver turns the ignition key to the +ACK or +APC position.

When off, the car radio R maintains its last known state, or the tuned frequency, the name of the station, the track number of the compact disk, the position of the read head, etc., so as to start again from this state when next woken up. The same is done by the navigation aid system N by maintaining the current guidance, the last known position, etc., the two screens by retaining the brightness settings, etc., the DVD player with the point of progress in playing the DVD, etc., and the TV tuner with the last channel watched.

The compact disk changer is woken up and put to sleep, lust like the navigation aid system N, by a signal $S_{RE}$ from the car radio at the same time as the latter. When the changer is asleep, it maintains the state of its loader—state of each deck: empty or occupied, position of the read head number of the deck engaged, etc.

The telematics unit T provides access to a set of remote services, including emergency call in the event of a problem or an accident. This emergency call can be triggered at any time by the user via an emergency call button $B_A$.

The DVD player $L_D$ also serves as audio-video controller. It manages the sound level of the earphone outputs for the rear passengers and redirects the video streams to the front screen and/or to the rear screen according to requests from the passengers. It also manages a button $B'_{NF}$, which enables the rear passengers to control the switching on and switching off of the rear video system comprising a DVD player, a TV tuner and a rear screen.

In this example, the navigation aid system N, the hands-free telephone kit $K_t$, the telematics unit T, the DVD player $L_D$, the TV tuner, the two screens A and $E_a$, the car radio R and the CD changer all have good reasons to remain permanently powered, including when the vehicle is asleep. This is why they all discharge the battery, with consumptions equal, for example, to the following values:

front screen: 1 mA
rear screen: 1 mA
navigation: 1 mA
car radio: 1 mA
CD changer: 0.5 mA
hands-free kit: 0.5 mA
telematics: 1 mA
DVD player: 1 mA
TV tuner: 0.5

The invention involves overcoming this unnecessary electrical consumption by combining in a single module, or in two at most, a function for managing the power supplies of the various elements of the multimedia system that consume most frequently, particularly while the vehicle is asleep, this module being intended to fulfill this management function in parallel with the modules handling the function managing the other power supplies of the vehicle.

For this the subject of the invention is a device for managing the power supply for the multimedia system of a motor vehicle, comprising a number of modules, each fulfilling at least one function requiring an electrical power supply, particularly on standby characterized in that it comprises at least one module comprising a microprocessor, storage means and counting means, and receiving as input:

a permanent electrical power supply from the electric vehicle battery;
wake-up/sleep information from the vehicle control computers based on the ignition key in particular;
wake-up/sleep information from control means specific to the multimedia system; to:
deliver wake-up/sleep and/or switched power supply signals to said modules of the multimedia system;
save information from said modules of the multimedia system in the volatile storage means;
keep time.

According to another characteristic of the invention/the management device also receives as input wake-up and/or sleep control signals from certain modules specific to the multimedia system.

According to another characteristic of the management device according to the invention, the module is the central unit of the vehicles which manages in particular the locking of the vehicle, the opening of the doors, the waking-up and putting to sleep of the functional electronic modules of the vehicle, the operation of the fuses and of the power supply relays, which is powered by the vehicle battery, which is linked to the steering column controls and the ON/OFF buttons of the front and rear parts of the multimedia system in the vehicle and which handles time computation, to directly and individually control and supply power to each module of the multimedia system such as the car radio, the time and outside temperature display or a DVD player located in the rear.

According to another characteristic of the management device according to the invention, the module is a module of the multimedia system, on the one hand receiving from the vehicle central unit a permanent power supply signal and wake-up/sleep signals from the vehicle and information passing through the vehicle CAN network and, on the other hand, receiving information via the steering column controls or the ON/OFF button of the system, to deliver wake-up/sleep signals to the other modules of the multimedia system and control their electrical power supply by switched power supply signals.

According to another characteristic of the management device according to the invention, the module is a car radio which is supplied with power by the battery, manages time computation and is provided with a volatile memory to save information originating from the time and outside temperature display and from the compact disk changer to control and supply power to the other modules such as the display or the compact disk changer.

According to another characteristic of the management device according to the invention, the module is the time and outside temperature display which is supplied with power by the battery, manages time computation and is provided with a volatile memory to save information originating from the car radio and from the compact disk changer.

According to another characteristic of the management device according to the invention, the module is a module of the multimedia system on the one hand receiving from the vehicle central unit a permanent power supply signal and wake-up/sleep signals from the vehicle and information passing through the vehicle CAN network and, on the other hand, receiving information via the steering column controls or the ON/OFF button of the system, and wake-up and/or sleep control signals from certain modules specific to the multimedia system to deliver wake-up/sleep signals to the other modules of the multimedia system and control their electrical power supply by switched power supply signals.

According to another characteristic of the management device according to the invention, the management module is the vehicle navigation module, which is linked to the ON/OFF button of the front part of the multimedia system and to the steering column controls, to wake-up/sleep control means for certain modules specific to the multimedia system, such as an emergency call button or an ON/OFF button of the rear part of the multimedia system, intended to send it wake-up or sleep commands, to control the operation and the power supply of the other modules of the system.

According to another characteristic of the management device according to the invention, the multimedia system being made up of two parts, one and the other corresponding respectively to the functions accessible from the front and from the rear of the vehicle, it comprises two modules, each of these modules belonging to one of said parts of the multimedia system and each comprising a microprocessor, storage means and counting means, and receiving as input:

a permanent electrical power supply from the electric vehicle battery;
wake-up/sleep information from the vehicle control computer, based on the ignition key in particular;
wake-up/sleep information from control means specific to its part of the multimedia system; to:
deliver wake-up/sleep and/or switched power supply signals to said modules of its own part of the multimedia system;
save information in the volatile storage means;
keep time using the counting means.

According to another characteristic of the management device according to the invention, the two modules are on the one hand the navigation module which manages the power supply and operation of the modules of the front multimedia system, which receives a permanent electrical signal and wake-up/sleep signals from the vehicle central unit and is connected to the wake-up/sleep control signals for the multimedia system, and on the other hand the DVD player of the rear video system which manages the power supply and operation of the modules of the rear multimedia system, which also receives a permanent electrical signal from the battery and wake-up/sleep signals from the operation button of the rear multimedia system of the vehicle.

According to another characteristic of the management device according to the invention, the two modules are the display and the telematics unit of the vehicle multimedia system, permanently supplied with power by a signal from the vehicle central unit, the display also receiving a wake-up/sleep signal from said unit and in turn sending a wake-up/sleep signal to the other modules, including the telematics module, which is periodically woken up when the vehicle is asleep, to check whether a remote server is asking it to wake up the vehicle.

BRIEF DESCRIPTION OF THE DRAWING

Other characteristics and advantages of the invention will become apparent from reading the description of several exemplary embodiments, illustrated by the following figures:

FIG. 8: a second example of the second embodiment in which the power supply management is handled by the vehicle navigation system;

FIGS. 10 and 11: two examples of a third embodiment in which the power supply management is handled by two modules specific to the vehicle multimedia system.

DETAILED DESCRIPTION

In a motor vehicle whose multimedia system comprises, for example, a car radio, a display, a compact disk changer, a navigation system, a telematics assistance system, a DVD player, a TV tuner and a hands-free kit for telephone in particular, the electrical power supply management device of this system is, according to the invention, made up of a module M comprising a microprocessor storage means and counting means to handle time computation, and inputs intended for monitoring wake-up information.

Figure 1:
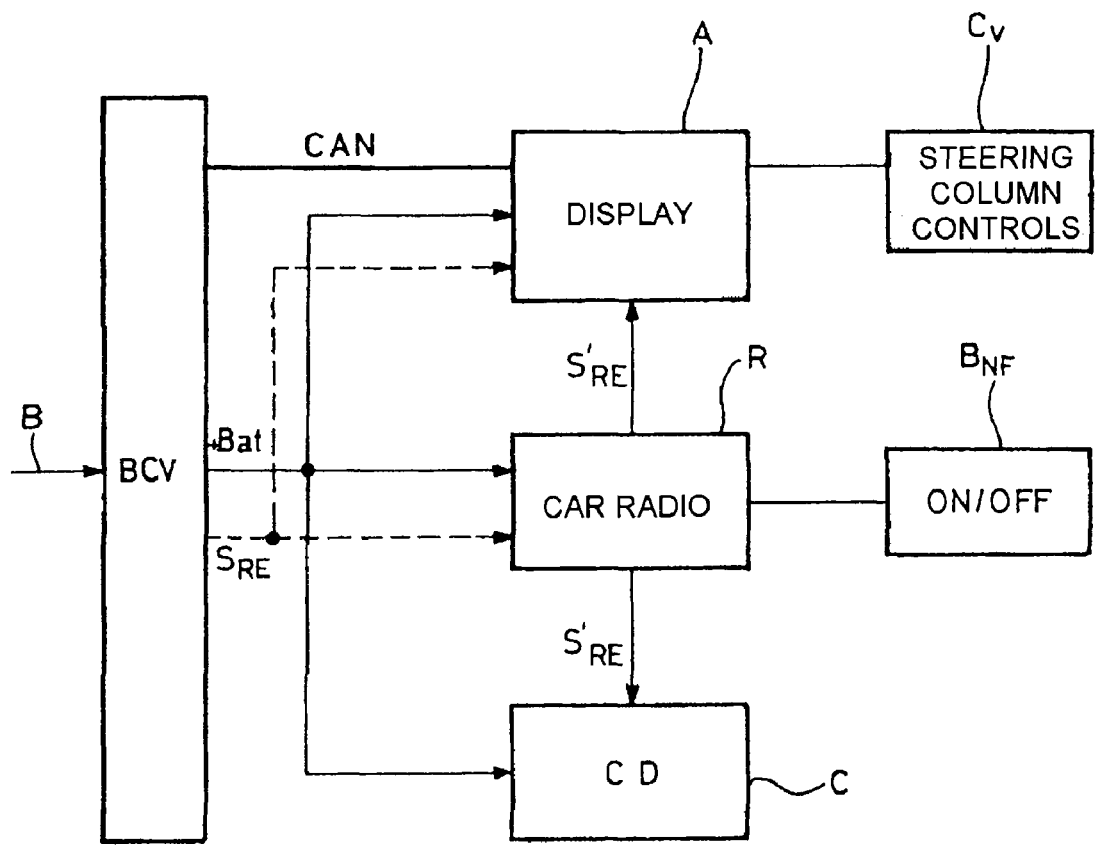
FIGS. 1 and 2: diagrams representing exemplary multimedia systems for a motor vehicle.
Figure 2:
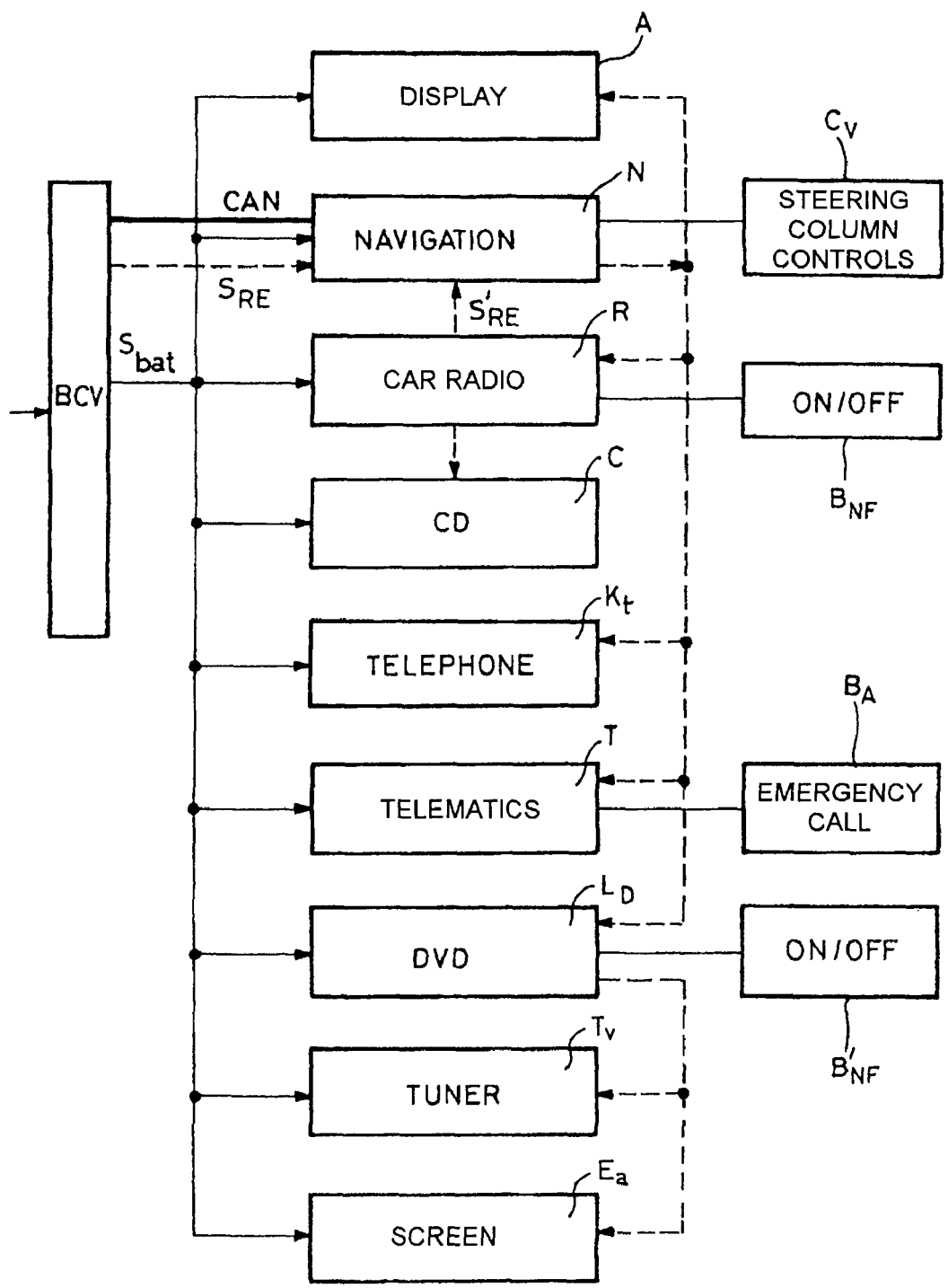
Figure 3:
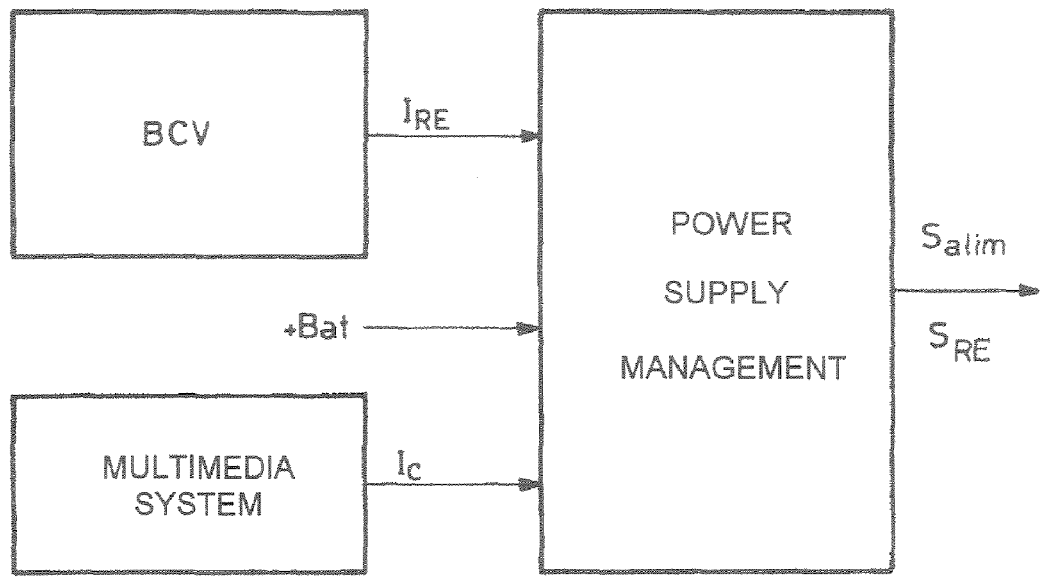
FIGS. 3 and 4: two functional diagrams of the power supply management device of the multimedia system of a motor vehicle.

In a first version (FIG. 3), the module receives as input firstly the permanent electrical power supply +Bat from the vehicle battery B and wake-up or sleep information $I_{RE}$ for the vehicle from the vehicle control computer BCV, according, for example, to the ignition key or magnetic locking card of the vehicle indicating whether the accessories need to be powered, or if the key is in the after-contact position +APC, the state of the engine in operation or stopped, the state of charge of the battery. It also receives information $I_C$ intended more specifically for the operation of the multimedia system itself, originating from control means such as an ON/OFF button $B_{NF}$ or steering column controls $C_V$, enabling the user to ask for the system to be switched on or switched off.

This module therefore receives information from the greatest possible number of means of detecting wake-up or sleep and electrical power supply causes, both for the vehicle and for the multimedia system itself.

As output, this management module controls the electrical power supply $S_{alim}$ of the multimedia system, and the waking-up or putting to sleep $S_{RE}$ of the various modules that make up the system according to information either from the vehicle or from its own inputs.

For this, it fulfills certain functions that remain active when the vehicle is asleep, such as maintaining time computation, saving in volatile memory certain data concerning the radio for example, monitoring the wake-up conditions of all or part of the multimedia system, and the functions having the greatest availability constraints such as display of the time or of the outside temperature.

Figure 4:
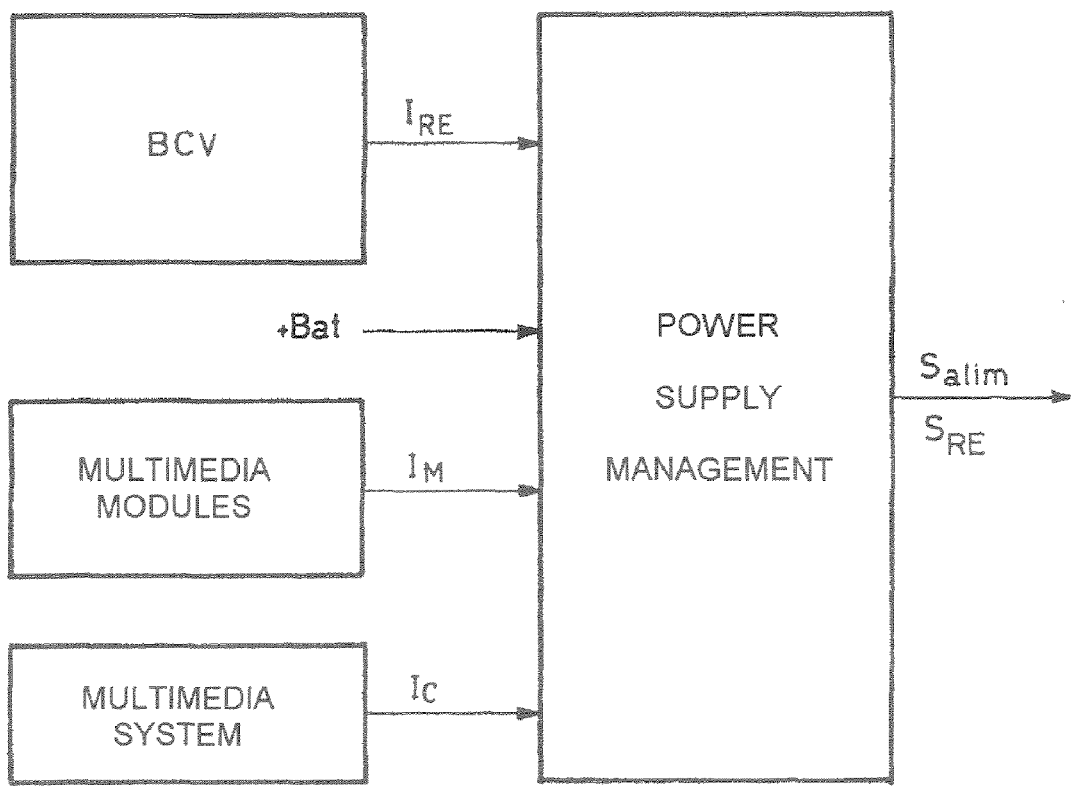

In a second version (FIG. 4), the module receives wake-up and/or sleep information $I_M$ from the modules of the multimedia system, such as the car radio, the hands-free telephone kit $K_t$ for example.

According to a first embodiment, the management module is implemented by the computer or vehicle central unit, BCV, which manages the waking-up and putting to sleep of the various electronic modules of the vehicle, and their electrical power supply. According to the invention, the management module that is permanently powered by the battery therefore manages both the waking-up of the vehicle and that of the modules of the multimedia system to which it is linked and their electrical power supply.

Figure 5:
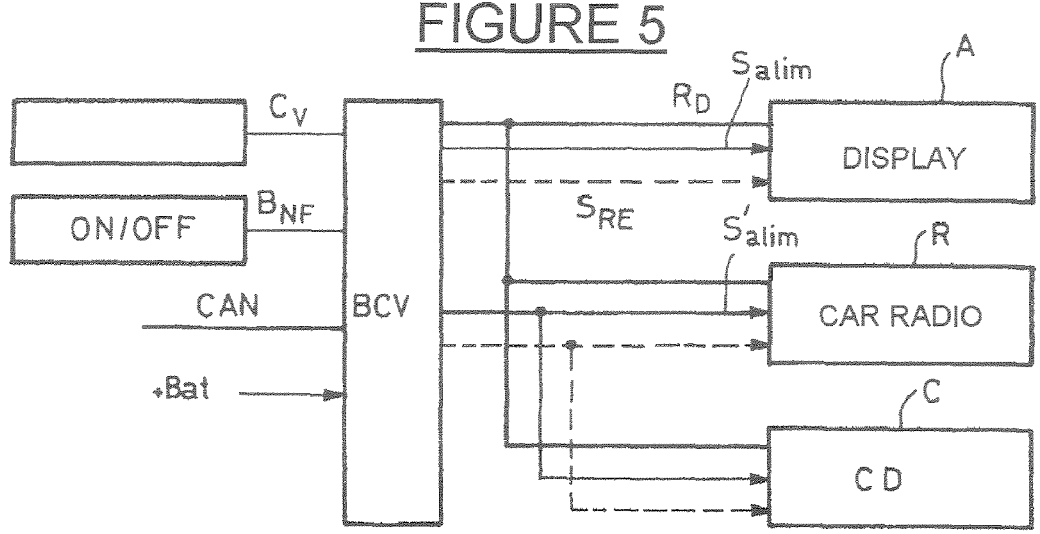
FIGS. 5 and 6: two examples of a first embodiment in which the power supply management is handled by the vehicle central unit.

Since this BCV unit is permanently powered by the +Bat signal from the battery, it can maintain time computation and the saving of certain data in a volatile memory, and monitor the state of the system's ON/OFF button $B_{NF}$, that of the steering column controls $C_V$ to which it is linked, as is shown in the diagram of FIG. 5. In the case where the vehicle is equipped with a telematics assistance system T (FIG. 6), the BCV module is also linked to an emergency call button $B_A$ and, in the case where the system comprises modules fulfilling multimedia functions for the rear of the vehicle, separate from those used in the front the BCV unit is linked to a rear system ON/OFF button $B'_{NF}$.

Before ordering the electrical power supply to be cut off, the vehicle central unit BCV enables the multimedia appliances to save their information to the volatile memory of the management module. These information interchanges are conducted via the multimedia data network $R_D$.

When the display A, or front screen, receives the command to wake up and it is electrically powered by the signal $S_{alim}$, it displays the time and the outside temperature that the vehicle CAN network supplies to the central unit BCV, which transmits to it via the multimedia data network $R_D$. The display A has a switched power supply $S_{alim}$ and a wake-up/sleep signal $S_{RE}$ that are specific so as to be able to display the time and the outside temperature for example, without the other multimedia appliances needing to be powered. Thus, in the example of FIG. 5, each multimedia appliance is woken up and supplied with power directly and individually by the BCV unit. The display A can display the time and the temperature when it receives a power supply signal $S_{alim}$ and a specific wake-up signal $S_{RE}$ from the BCV unit without the latter powering up the car radio R and the CD changer, the consumptions of which are therefore zero. However it is also possible for the BCV unit to supply power to and wake up the display A for the time and the temperature while powering up, via a signal S'$_{alim}$, the car radio R and the changer C without waking them up, which provokes a very low, non-zero consumption. In this case, the two power supply signals S$_{alim}$ and S'$_{alim}$ for the display A and the car radio R respectively are equal.

When the driver of the vehicle presses the ON/OFF button B$_{NF}$ of the multimedia system or a steering column control C$_V$, the management module, implemented by the vehicle central unit BCV, supplies power to then wakes up the multimedia appliances—display, car radio, CD changer, etc.

A further press on these controls or closing of the vehicle by the driver causes the vehicle central unit BCV to send a request to switch off multimedia appliances among other things, and then their power supply to be cut off so as to allow the power supply manager time to perform the memory backups.

When the vehicle is asleep, the power supplies of all the multimedia appliances are cut off so that their electrical consumption is zero.

With this exemplary embodiment, the consumption of the system when the vehicle is asleep becomes:
display: 0 mA
car radio: 0 mA
CD changer: 0 mA
or 0 mA in total.

With a system comprising a larger number of units, the consumption saving is greater.

Figure 6:
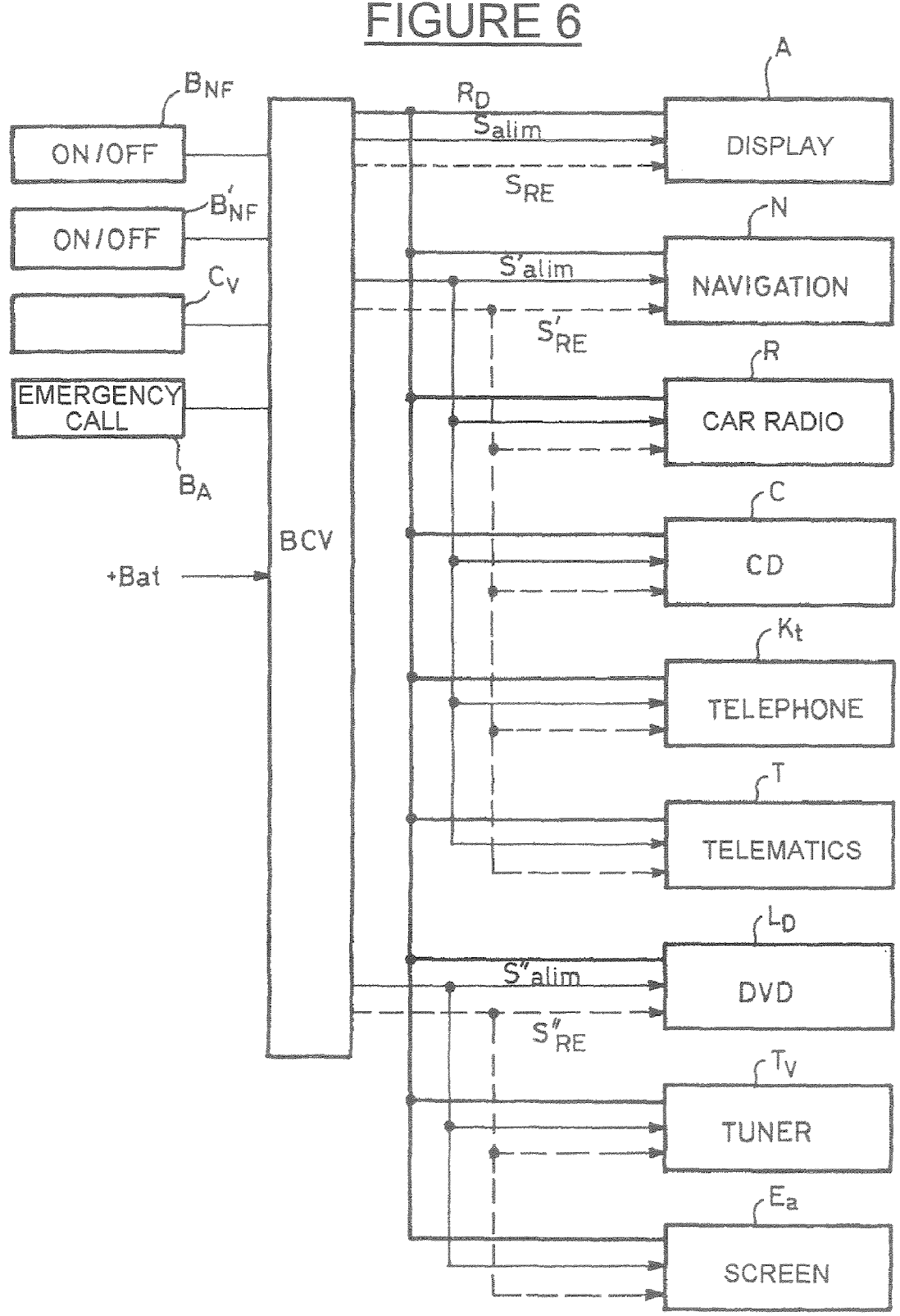

In the example of FIG. 6, all the means for waking up the system, even partially, have been combined on the vehicle central computer BCV, which is permanently powered by the +Bat signal from the battery. As previously, it manages time and stores context information for all the computers of the multimedia system that it powers, wakes up and puts to sleep. In addition to the steering column controls C$_V$ and the ON/OFF button B$_{NF}$ of the multimedia system, the vehicle central unit is linked to an emergency call button B$_A$ and to a rear video system operation button B'$_{NF}$.

The front screen or display A has a switched power supply S$_{alim}$ and a specific wake-up/sleep signal S$_{RE}$ so as to be able to be woken up separately, to display the time and the temperature, when the multimedia system is off.

The rear video system, consisting of a DVD player L$_D$, a tuner T$_V$ and a rear screen E$_A$ has a switched power supply S''$_{alim}$ and a wake-up/sleep signal S''$_{RE}$ that is different from those S$_{RE}$ and S'$_{RE}$ that respectively power the display and the multimedia modules such as the car radio R or the hands-free telephone kits K$_t$ in particular, located in the front of the vehicle, so as to be able to be woken up separately when the rear passengers request its activation while the multimedia system is off.

In the sleep phases, the multimedia computers return their context information to the vehicle central unit for storage, via the multimedia data network R$_D$ (CAN, MOST, IEEE 1394, . . . ). The vehicle central unit returns the information on wake-up.

When the vehicle and the multimedia system are asleep, the standby consumption of the multimedia system is zero, since their power supply is cut off, whereas it is around 7.5 mA with the conventional arrangement.

Another embodiment of the same principle would be to have a single power supply and a single signal for waking up then putting back to sleep the appliances not involved in the wake-up using messages over the multimedia data network.

Figure 7:
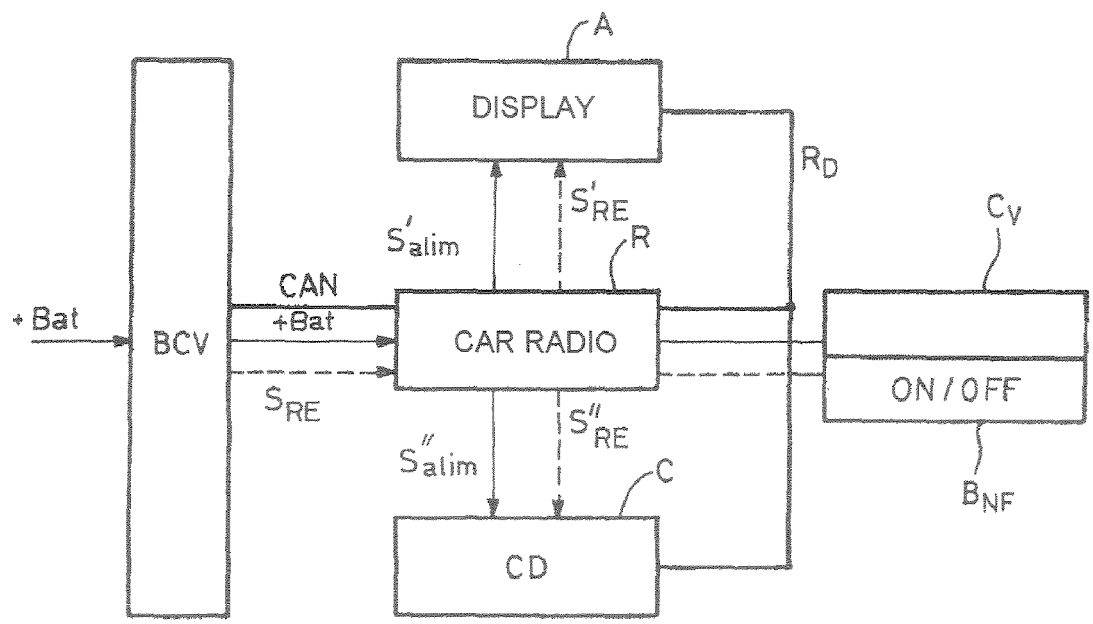
FIG. 7: a first example of a second embodiment in which the power supply management is handled by the vehicle car radio.

In a second embodiment the management module is implemented by a module of the multimedia system, which can be, for example, a car radio R in the example of FIG. 7. The vehicle central unit BCV is permanently powered by the battery and delivers to the car radio R a permanent power supply signal +Bat and wake-up/sleep signals S$_{RE}$ from the vehicle for switching it on or switching it off, such as those for example from the ignition key or from the magnetic vehicle locking card indicating whether the accessories need to be powered, or if the key is in the after-contact position +APC, the state of the engine, in operation or stopped, the state of charge of the battery. The car radio R is also linked to the vehicle data CAN network which can itself broadcast additional information.

Furthermore, it must be linked to the ON/OFF button B$_{NF}$ and to the steering column controls C$_V$ of the multimedia system, or to an optional emergency call button B$_A$ intended to send it wake-up or sleep commands.

The fact of being permanently powered by the battery enables the car radio R to keep the time, to save certain data in volatile memory, to monitor the state of the ON/OFF button B$_{NF}$ or of the steering column controls C$_V$ provoking a sleep signal. The car radio R is linked to the display A and to the compact disk changer C of the multimedia system, for which it controls the electrical power supply by a switched power supply signal S'$_{alim}$ and S''$_{alim}$ respectively and their waking-up or their putting to sleep by a respective signal S'$_{RE}$ and S''$_{RE}$. It does not necessarily supply them with power and wake them up together, because when the user arrives, the car radio can be programmed to supply power to and wake up the time and outside temperature display, while keeping the CD changer off until the user decides.

When the driver of the vehicle presses the ON/OFF button of the multimedia system B$_{NF}$ or a steering column control C$_V$, the car radio R wakes up and electrically powers the display A and the compact disk changer C. When the display is on, it displays the time and the outside temperature that is sent to it via the vehicle CAN network then via the car radio and the multimedia data network R$_D$.

A further press on the OFF button of the system or closure of the vehicle by the driver provokes a sleep request for the display and the compact disk changer, by the car radio which stops supplying power to them. During the sleep phase, these two elements of the multimedia system can return certain information to the volatile memory of the car radio, which will restore this information on the next wake-up via the multimedia data network R$_D$. Thus, when the vehicle is asleep, the power supplies for all the multimedia modules are cut off except for the car radio which consumes only a standby current of around one milliamp.

In some particular cases, for example if the battery becomes too low, the vehicle requests the switching off of the energy-consuming functions in the electronic computers while keeping the microprocessors active and can therefore request the switching off of the multimedia system using additional information broadcast over the vehicle CAN network. The car radio can be switched off only partially, continuing at least to listen to the vehicle CAN network, whereas the other elements of the multimedia system that are linked to it are off. This additional information on the state of the battery can be managed by a vehicle computer, for example the one controlling the electrical power supply, which will pass the switch-off and switch-on requests via the wake-up/sleep wire which controls the car radio.

Immediately the authorization to operate returns over the vehicle CAN network or over the wake-up wire, the car radio recognizes it for itself and for the other elements that are attached to it.

When only the display shows that it is woken up by displaying the time and the temperature, without the car radio showing that it is woken up itself, the latter consumes a few hundred microamps but the compact disk changer does not consume anything at all.

This use of the vehicle CAN can be replaced by a more intelligent management of the wake-up/sleep wire of the radio by another computer of the vehicle (intelligent +ACC, for example).

With this exemplary embodiment, the consumption of the multimedia system when the vehicle is asleep becomes:
display: 0 mA
car radio: 1 mA
CD changer: 0 mA
or 1 mA in total.

FIG. 8 shows another example of the second embodiment in which the management of the power supply, even partial, is handled by the vehicle navigation module N, which is not only linked to the ON/OFF button $B_{NF}$ of the multimedia system and to the steering column controls $C_V$, but also to means of controlling the wake-up/sleep means of certain modules such as an emergency call button $B_A$ or an ON/OFF button $B'_{NF}$ of the rear multimedia system, intended to send it wake-up or sleep commands.

This navigation module N is the only module of the multimedia system to be permanently powered by the battery +Bat, via the vehicle central unit BCV, which sends it the wake-up/sleep signals $S_{RE}$. This navigation module manages the time and stores the context information of all the computers of the multimedia system via the multimedia data network $R_D$.

Furthermore, it powers and wakes up and puts to sleep the other modules of the system. The rear video system, consisting of the DVD player $L_D$, the tuner $T_V$ and the rear screen $E_a$, has a wake-up/sleep signal $S''_{RE}$ that is different from the one $S'_{RE}$ that is sent to the modules fulfilling the functions in the front of the vehicle, and a signal $S''_{alim}$ that is different from the one $S'_{alim}$, in order to be able to be woken up separately when the rear passengers request its activation when the multimedia system is off.

In the sleep phases, the multimedia computers return their context information for storage via the multimedia data network $R_D$ (CAN, MOST, IEEE 1394, . . . ), to the navigation module which restores it to them on wake-up.

When the vehicle and the multimedia system are asleep the standby consumption is 1 mA in the navigation module and zero in the other modules since their power supply is cut off. The total standby consumption is therefore 1 mA instead of 7.5 mA with the conventional arrangement.

Figure 9:
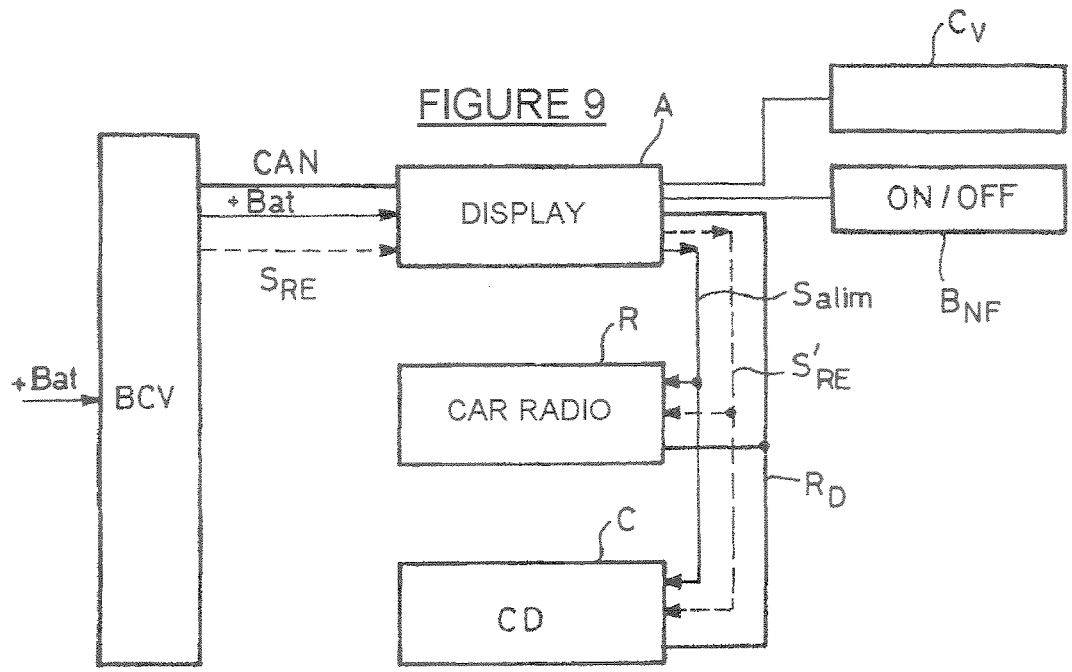
FIG. 9: a third example of the second embodiment in which the power supply management is handled by the vehicle display.

According to a third example of the second embodiment, the management module is implemented by the display A, provided with time management means and a memory that is volatile or not, as shown in FIG. 9. The vehicle central unit BCV is powered by the battery and delivers a permanent electrical power supply signal +Bat to the display, and wake-up/sleep signals $S_{RE}$ from the vehicle for switching it on or switching it off. The display is also linked to the vehicle data CAN network to receive additional information, in particular the outside temperature.

As in the previous mode, the display A must be connected to the ON/OFF button $B_{NF}$ of the multimedia system and to steering column controls $C_V$, to control the electrical power supply of the other elements of the multimedia system, the car radio R and the compact disk changer C for example, and their waking up or their putting to sleep when the user requests it.

When the driver presses the ON/OFF button of the multimedia system or a steering column control, the display A wakes up the car radio R and the CD changer by a signal $S'_{RE}$. The display A is itself woken up by such presses or by a wake-up signal sent by the vehicle central unit BCV, and it then displays the time that it has computed itself and the outside temperature. When the display A is the only one to be woken up, the car radio R and the CD changer consume nothing.

A further press on the OFF button of the system or a sleep signal sent on closure of the vehicle for example, causes the display to be put to sleep, which in turn asks the car radio R and the CD changer to go to sleep but these two elements can return certain information to be saved to the display during the sleep phase information that will be returned to them when next woken up, via the multimedia data network $R_D$.

When the vehicle is asleep, the power supply signal $S_{alim}$ for the car radio and the CD changer is cut off only the display retains a standby consumption.

As for the previous embodiment, in certain particular cases, battery too low state in particular, the vehicle asks for the multimedia system to be switched off using additional information broadcast over the vehicle CAN network. In such cases, the display orders the car radio R and the CD changer to go to sleep, but the display can be switched off only partially, continuing to listen for the information circulating over the vehicle CAN network at least, or also displaying the time and the outside temperature. Immediately the authorization to operate the multimedia system returns over the CAN network, the display recognizes it and wakes up the other elements of the multimedia system. A more intelligent management of the wake-up/sleep wire of the display can be provided by the vehicle central unit for example.

In this exemplary embodiment where the management of the electrical power supply of the multimedia system is implemented by the display A separate from the car radio R, said display has the advantage of always being on when the multimedia system is invoked, and during certain phases where all the system is off in order for it to continue to display the time and the outside temperature. Given that all the wake-up or sleep causes, from the vehicle CAN network, from the ignition key +ACC, from the ON/OFF button of the system or from steering column controls, directly culminate at the display, all the other multimedia elements can be completely off while it remains on.

The electrical consumption of the multimedia system while the vehicle is asleep is equal to that of the display, or approximately 1 mA, the car radio and the CD changer consuming nothing.

In a third embodiment, a first example of which is represented in FIG. 10, the management of the power supply for the modules of the multimedia system is handled by two modules, and no longer just one as in the examples described previously. As in the case of FIG. 6, the multimedia system is made up of two parts, the one and the other corresponding respectively to the functions accessible from the front and from the rear of the vehicle. Each of the two modules belongs to one of said parts of the multimedia system and comprises a microprocessor, storage means and counting means. Each receives as input a permanent electrical power supply +Bat from the electric battery of the vehicle, via the vehicle central unit BCV, wake-up/sleep information from control means specific to its part of the multimedia system, and at least one module receives wake-up/sleep information $S_{RE}$ from the vehicle control computer, according to the ignition key in particular. In the case of FIG. 10, the management of the power supply S'$_{alim}$ and of the operation S'$_{RE}$ of the modules of the front multimedia system is handled by the navigation module N, which receives a permanent electrical signal +Bat and wake-up/sleep signals S$_{RE}$ from the vehicle central unit, and is connected to the wake-up/sleep control signals of the multimedia system, such as those sent by the buttons B$_{NF}$, B$_A$, or the controls C$_V$.

The management of the power supply S"$_{alim}$ and of the operation S"$_{RE}$ of the modules of the rear multimedia system is handled by the DVD player, which also receives a permanent electrical signal +Bat from the battery and wake-up/sleep signals from the operation button B'$_{NF}$ of the rear multimedia system of the vehicle. All the modules of the front and rear multimedia system are connected to the multimedia data network R$_D$.

Each of the two management modules delivers wake-up/sleep and/or switched power supply signals to said modules of its own part of the multimedia system. The two management modules each save information from the appliances of its own multimedia part.

This embodiment makes it possible, for example, to activate the rear video system without switching on the navigation module, which can, however, control the activation of this system for its own requirements, to watch a television channel or a DVD on the front display A. In this case, the total standby consumption is around 2 mA, instead pf 7.5 mA in the conventional arrangement.

Figure 11:
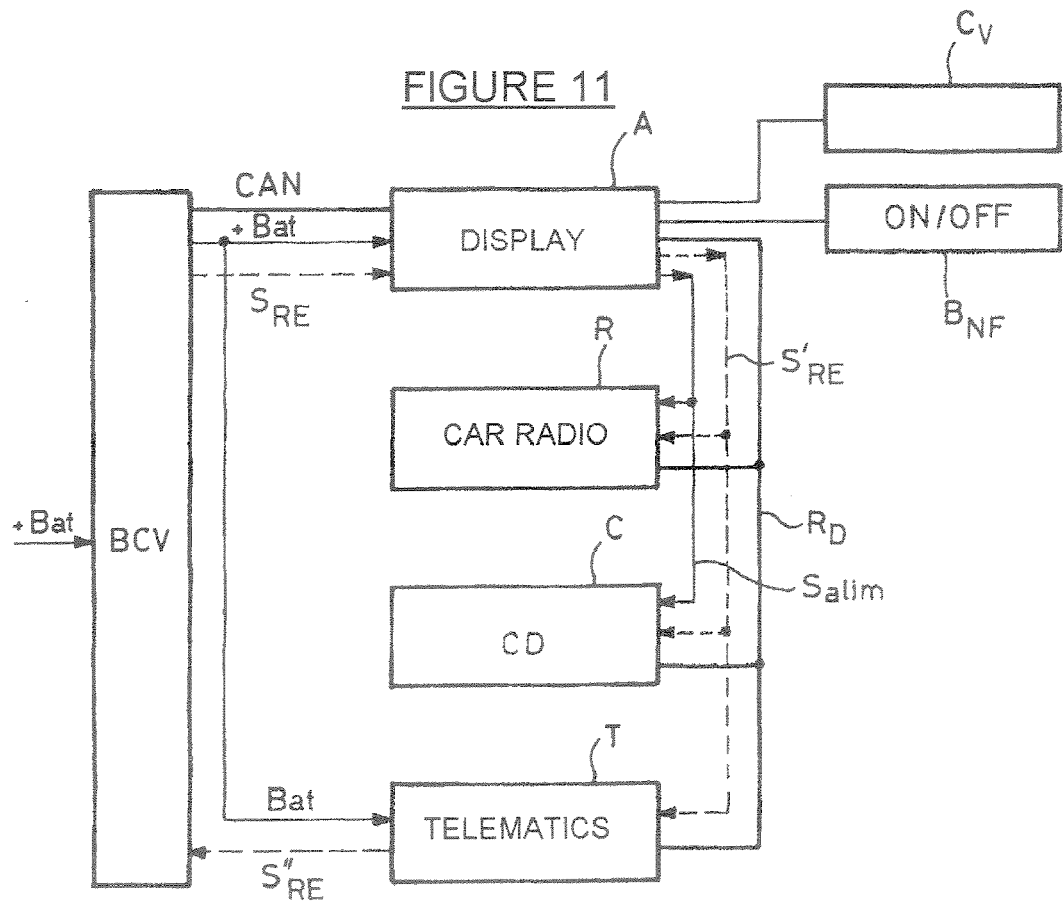

FIG. 11 represents a second example of this third embodiment, based on two modules of the multimedia system consisting of a display A separate from a car radio R, a compact disk changer C$_D$ and a telematics module T, all four being interlinked by the multimedia data network R$_D$. The display A and the telematics unit T are permanently powered by a +Bat signal from the vehicle central unit BCV. The display also receives a wake-up/sleep signal S$_{RE}$ from said BCV unit and in turn sends a wake-up/sleep signal S'$_{RE}$ to the other modules, including the telematics module T. The latter is periodically woken up when the vehicle is asleep, to check whether a remote server is asking it to wake up the vehicle via an S"$_{RE}$ signal.

If such a request occurs, the telematics module T wakes up the vehicle central unit BCV, which wakes up the vehicle and, if necessary, the separate display A, which in this case serves as a gateway between the vehicle CAN network and the multimedia data network R$_D$.

When the vehicle and the multimedia system are woken up normally, the separate display A supplies power to and wakes up the telematics module T in the same way as the car radio R or the CD changer.

To sum up, the power supply management system is quasi-centralized. One of the elements of the multimedia system remains permanently powered and has a means of waking up the centralized system activation manager.

Thus, the function managing the power supplies of the multimedia system of a motor vehicle can be implemented either in a module that is dedicated to it, or be incorporated in a vehicle power supply management function, or be incorporated with other multimedia functions or with other functions specific to the vehicle. When the multimedia systems are optional and varied, with a large number of possible combinations, this power supply management function is more wisely separate from the vehicle power supply management particularly because of the number of inputs to be managed and the consequential diversity.

Another advantage of the invention arises from the fact that the strategies for activating elements of the multimedia system can change, with only one unit needing to be modified.

The invention claimed is:

1. A device for managing power supply for a multimedia system of a motor vehicle, comprising:
    a number of functional modules, each fulfilling at least one function requiring an electrical power supply, including a management module including a microprocessor, a storage unit, and a counter, and the management module receiving as input:
    a permanent electrical power supply from an electric vehicle battery;
    wake-up/sleep information from a vehicle control computer, based on an ignition key; and
    wake-up/sleep information from a control specific to the multimedia system;
    wherein the management module is configured to:
        deliver at least one wake-up/sleep or switched power supply signal to the modules of the multimedia system;
        save information from the modules of the multimedia system in the storage unit; and
        keep time using the counter.

2. The management device as claimed in claim 1, wherein the management module further receives as input at least one wake-up or sleep control signal from certain modules specific to the multimedia system.

3. The management device as claimed in claim 2, wherein the management module is a module of the multimedia system, receiving from a vehicle central unit a permanent power supply signal and wake-up/sleep signals from the vehicle and information passing through the vehicle network, and receiving information via a control specific to the multimedia system including at least one of steering column controls or ON/OFF button of the system, and at least one of a wake-up or sleep control signal from certain modules specific to the multimedia system, to deliver wake-up/sleep signals to other modules of the multimedia system and control their electrical power supply by switched power supply signals.

4. The management device as claimed in claim 3, wherein the management module is a vehicle navigation module, which is linked to the ON/OFF button of a front part of the multimedia system and to the steering column controls, to a wake-up/sleep control for certain modules specific to the multimedia system, including at least one of an emergency call button or an ON/OFF button of a rear part of the multimedia system, intended to send the management module wake-up or sleep commands, to control operation and power supply of the other modules of the system.

5. The management device as claimed in claim 1, wherein the management module is a central unit of the vehicle, which manages locking of the vehicle, opening of doors, waking-up and putting to sleep of the functional modules of the vehicle, operation of fuses and of power supply relays, which are powered by the vehicle battery, which is linked to steering column controls and ON/OFF buttons of front and rear parts of the multimedia system in the vehicle and that handles time computation, to directly and individually control and supply power to each module of the multimedia system including at least one of a car radio, time and outside temperature display, or a DVD player located in the rear part.

6. The management device as claimed in claim 1, wherein the management module is a module of the multimedia system, receiving from a vehicle central unit a permanent power supply signal and wake-up/sleep signals from the vehicle and information passing through a vehicle network, and receiving information via a control specific to the multimedia system including at least one of a steering column controls or ON/OFF button of the system, to deliver wake-up/sleep signals to other modules of the multimedia system and control their electrical power supply by switched power supply signals.

7. The management device as claimed in claim 6, wherein the management module is a car radio that is supplied with power by the vehicle battery, manages time computation, and includes a volatile memory to save information originating from a time and outside temperature display and from a compact disk changer to control and supply power to other modules including at least one of the outside temperature display or the compact disk changer.

8. The management device as claimed in claim 6, wherein the management module is a time and outside temperature display that is supplied with power by the vehicle battery, manages time computation, and includes a memory to save information originating from a car radio and from a compact disk changer.

9. A device for managing power supply for a multimedia system of a motor vehicle, comprising:
 front and rear parts corresponding respectively to functions accessible from a front and from a rear of the vehicle; and
 a number of functional modules, including two management modules, each of the two management modules belonging to one of the parts of the multimedia system and each comprising a microprocessor, storage, and counter, and each of the two management modules receiving as input:
 a permanent electrical power supply from an electric vehicle battery;
 wake-up/sleep information from a vehicle central unit, based on an ignition key;
 wake-up/sleep information from a control specific to the corresponding part of the multimedia system;
 wherein each of the two management modules is configured to:
 deliver at least one wake-up/sleep or switched power supply signal to the modules of the corresponding part of the multimedia system;
 save information from the modules of the multimedia system in the storage;
 keep time using the counter.

10. The management device as claimed in claim 9, wherein the two management modules are a navigation module that manages the power supply and operation of the modules of the front part of the multimedia system, which receives a permanent electrical signal and wake-up/sleep signals from the vehicle central unit and is connected to wake-up/sleep control signals for the multimedia system, and a DVD player that manages the power supply and operation of the modules of the rear part of the multimedia system, which also receives a permanent electrical signal from the vehicle battery and wake-up/sleep signals from an operation button of the rear part of the multimedia system of the vehicle.

11. The management device as claimed in claim 9, wherein the two management modules are a display and a telematics unit of the vehicle multimedia system, permanently supplied with power by a signal from the vehicle central unit, the display also receiving a wake-up/sleep signal from the telematics unit and in turn sending a wake-up/sleep signal to other modules, including the telematics unit, which is periodically woken up when the vehicle is asleep, to check whether a remote server is asking the telematics unit to wake up the vehicle.

* * * * *